(12) United States Patent
Häupl

(10) Patent No.: US 12,275,162 B2
(45) Date of Patent: Apr. 15, 2025

(54) DUAL-SPINDLE CIRCULAR SAW FOR SAWING WOOD

(71) Applicant: Christian Häupl, Salzburg (AT)

(72) Inventor: Christian Häupl, Salzburg (AT)

( * ) Notice: Subject to any disclaimer, the term of this patent is extended or adjusted under 35 U.S.C. 154(b) by 758 days.

(21) Appl. No.: 17/425,823

(22) PCT Filed: Jan. 22, 2020

(86) PCT No.: PCT/AT2020/060018
§ 371 (c)(1),
(2) Date: Jul. 26, 2021

(87) PCT Pub. No.: WO2020/154752
PCT Pub. Date: Aug. 6, 2020

(65) Prior Publication Data
US 2022/0176581 A1    Jun. 9, 2022

(30) Foreign Application Priority Data
Jan. 30, 2019   (AT) .............................. A50076/2019

(51) Int. Cl.
*B27B 5/34*    (2006.01)
*B23D 45/10*   (2006.01)
(Continued)

(52) U.S. Cl.
CPC .............. *B27B 5/34* (2013.01); *B23D 45/105* (2013.01); *B23D 47/12* (2013.01); *B23Q 5/10* (2013.01); *B27B 7/04* (2013.01)

(58) Field of Classification Search
CPC .... B27B 5/30; B27B 5/32; B27B 5/34; B27B 33/04; B27B 7/04; B27B 7/02;
(Continued)

(56) References Cited

U.S. PATENT DOCUMENTS 2,009,354 A     5/1932   Burrell
3,768,350 A  * 10/1973   Coulter ................... B24B 27/06
                                                    451/21
(Continued)

FOREIGN PATENT DOCUMENTS

CN     104942649 A  *  9/2015  ........... B23Q 11/127
CN     107160237 A  *  9/2017
(Continued)

OTHER PUBLICATIONS

English language espacenet Abstract for DE 42 01 013 A1, Jul. 22, 1993.
(Continued)

*Primary Examiner* — Jennifer S Matthews
(74) *Attorney, Agent, or Firm* — Tiajoloff & Kelly LLP

(57) ABSTRACT

A dual-spindle circular saw (1) for sawing wood (2) with two saw groups (3) is proposed, wherein each saw group (3) comprises a drive (7) having an armature (5) and a stator (6) for rotary driving of a saw spindle (9) which is mounted in a housing (8) and which is connected in a rotationally fixed manner to at least one saw tool (11) comprising at least one exchangeable circular saw blade (10), and wherein the center distance (A) of the saw spindles (9) is adjustable by an actuator. In order to create particularly advantageous design conditions, it is proposed that the armature (5) is arranged in a rotationally fixed manner on the saw spindle (9) and the stator (6) is arranged in a rotationally fixed manner in the housing (8) between a fixed bearing (13) and a floating bearing (14) of the saw spindle (9), wherein the saw tool (11) is floatingly mounted on the saw spindle (9).

17 Claims, 4 Drawing Sheets

(51) Int. Cl.
   *B23D 47/12* (2006.01)
   *B23Q 5/10* (2006.01)
   *B27B 7/04* (2006.01)

(58) Field of Classification Search
   CPC ......... B27B 3/00; B27B 3/04; Y10T 83/6588; B23D 47/12; B23D 45/105
   See application file for complete search history.

(56) References Cited

U.S. PATENT DOCUMENTS

| | | | |
|---|---|---|---|
| 4,133,230 A | | 1/1979 | Inaba et al. |
| 5,303,754 A | * | 4/1994 | Rautio .................... B27B 33/20 144/41 |
| 2017/0361409 A1 | | 12/2017 | Feucht et al. |
| 2018/0236644 A1 | * | 8/2018 | Hare ....................... F16B 19/02 |

FOREIGN PATENT DOCUMENTS

| | | | | | |
|---|---|---|---|---|---|
| CN | 108015303 A | * | 5/2018 | ............... | B23Q 1/70 |
| CN | 108406342 A | * | 8/2018 | ............... | B23Q 1/70 |
| DE | 2336629 A1 | | 2/1975 | | |
| DE | 2724440 A1 | | 1/1978 | | |
| DE | 4038129 C1 | | 6/1992 | | |
| DE | 4201013 A1 | | 7/1993 | | |
| DE | 19955590 A1 | | 7/2001 | | |
| DE | 102007033620 A1 | | 2/2008 | | |
| DE | 102014223544 A1 | | 5/2016 | | |
| DE | 102016119821 A1 | * | 4/2018 | ........... | B23Q 1/0027 |
| EP | 0785051 A1 | | 7/1997 | | |
| EP | 1842614 A1 | | 10/2007 | | |
| WO | WO-0067967 A1 | * | 11/2000 | ............... | B27B 5/34 |
| WO | WO-2004011817 A1 | * | 2/2004 | ........... | B23Q 11/122 |

OTHER PUBLICATIONS

English language espacenet Abstract for DE 40 38 129 C1, Jun. 4, 1992.
English language espacenet Abstract for DE 2336629 A1, Feb. 6, 1975.
English language espacenet Abstract for DE 19955590 A1, Jul. 19, 2001.
English language espacenet Abstract for EP 07 85 051 A1, Jul. 23, 1997.
English language espacenet Abstract for EP 18 42 614 A1, Oct. 10, 2007.
English language espacenet Abstract for DE102007033620 , Feb. 14, 2008.

* cited by examiner

DUAL-SPINDLE CIRCULAR SAW FOR SAWING WOOD

FIELD OF THE INVENTION

The invention relates to a dual-spindle circular saw for sawing wood comprising two saw groups, wherein each saw group has a drive, comprising an armature and a stator, for the rotary driving of a saw spindle which is mounted in a housing and which is connected in a rotationally fixed manner to a saw tool comprising a plurality of exchangeable circular saw blades, and wherein the center distance of the saw spindles can be adjusted by means of an actuator.

DESCRIPTION OF THE PRIOR ART

The use of dual-spindle circular saws has become established in the field of sawing technology for processing round and square timber in recent decades. Generic devices are known, for example, from DE 40 38 129 A and EP 0 785 051 A. The main advantages of this technology are a cutting surface with the best surface properties, precise cutting stability and very high cutting performance. For example, the circular saw itself can be designed as a group saw, i.e. it can perform several cuts simultaneously with several saw blades arranged on a common tool, which means that particularly high volumetric outputs can be achieved with relatively simple machines.

Dual-spindle circular saws have a limited cutting height for technical reasons due to the circular saw blades and their maximum useful diameter, which is why the cutting process is also performed from two opposite sides, with two saw groups, wherein saw blades always work in pairs in a common cutting plane. The material to be cut is pushed between the saw spindle axes through the dual-spindle circular saw with a suitable conveyor drive.

In addition, the two saw groups are arranged with an offset in the cutting direction so that there is a vertical overlap of several millimeters between the centrifugal circles of the circular saw blades working in one and the same cutting plane for clean cutting through the sawn timber. This overlap, which is free of lateral offset, is a prerequisite for a flat surface of the sawn material.

To ensure this, it is necessary that the saw spindles of the saw groups are adjustable in their radial distance from each other, depending on the circular saw blade diameter, and also adjustable in height for horizontal spindles and adjustable in side for vertical spindle position, so that the different total cutting heights can be divided into equal halves on both saw groups. To avoid lateral offset, the position of the saw spindles can be adjusted in the direction of the saw spindle axis.

For small saw groups that do not operate in dual-spindle circular saws, it is known to use smaller saw spindle motors with lower motor powers and a short projecting saw shaft stub. However, these are not suitable for use in dual-spindle circular saws, as the motors do not allow their use due to the power-related dimensions. It is not possible to scale up a smaller unit so that it can be used in a dual-spindle circular saw. For this reason, the known saw tools are also mounted at both ends in a machine frame and the saw spindles are driven via belt drives, which in turn represents a very high alternating load for the saw spindle.

For illustration purposes, indicative values of the technical data of a saw group are shown, for example. A motor power of around 600 KW (at 3000 rpm) is required, wherein the motor speed can vary from 0 to 4000 rpm. The outer diameter of a standard motor of this type would be around 900 mm, which would require circular saw blades with at least this diameter.

A known sawing machine DE 19955590 A1 has a plurality, namely four per machine unit, of saw shaft arrangements adjustable independently of one another transversely to the feed direction of the material to be sawn, wherein each of the four saw shafts carry at least one saw blade cutting into the material to be sawn. The wood is thus cut between four saw shafts and not between two, as in a dual-spindle circular saw according to the invention. In addition, the sawing machine comprises several machine units.

The drive power and speed are based on experience with conventional high-performance circular saws in which a separate saw spindle is used and the power must be transmitted via belts. The belt pull required for a belt drive of this magnitude far exceeds the bearing load that occurs due to the regular cutting forces. Such forces therefore require larger bearings, which in turn are not suitable for the required speeds. To circumvent this problem, belt drives have already been proposed that comprise two belts offset by 180 degrees from each other and pulling in opposite directions. Due to the fact that the saw spindles have to be adjusted relative to each other, this results in a very complex design weighing about 5 metric tons, with a cutting accuracy of less than 0.1 mm.

DESCRIPTION OF THE INVENTION

The invention is thus based on the object of creating a dual-spindle circular saw of the type described at the outset, which permits clean cutting within narrow tolerances and at the same time has a compact design and enables a quick and easy saw tool change.

The invention solves the given problem in that the armature is arranged in a rotationally fixed manner on the saw spindle and the stator is arranged in a rotationally fixed manner in the housing between a fixed bearing and a floating bearing of the saw spindle, wherein the saw tool is floatingly mounted on the saw spindle.

Since the motor is mounted directly on the saw spindle, there is no need for external drives that would put excessive strain on the saw spindle. This means that there is no excessive bending stress on the shaft and no resulting deflection of the saw tool attached to the saw spindle, which allows clean cutting within narrow tolerances and overhung mounting of the saw tool. This floating bearing of the saw tool in turn allows a quick and easy change of the saw tool. The drive, in particular an electric motor or the like, with the heavy saw spindle and its high mass moment of inertia is very favorable for smoothing out the shock loads occurring during sawing operation and for avoiding a continuation of the load shocks into the electrical system with consequential damage.

The consequence of this very advantageous arrangement is that the armature of the drive sits directly on the saw spindle between the fixed bearing and the floating bearing. In particular, the fixed bearing is arranged between the armature and the saw tool in order to keep the tolerances of the dimensional accuracy in the event of temperature changes of the saw spindle and the associated change in length within very small ranges. In order that the outer diameter of the drive, in particular the electric motor, can be kept small enough—it must, after all, be less than the diameter of the circular saw blade, so that a corresponding adjustment of the two shafts with the correct spacing is possible—this has a corresponding armature and thus stator length. The diameter of the circular saw blade should remain as small as possible, since too large an outer diameter would have negative effects on the rigidity of the circular saw blades and thus on the cutting result.

Compared to the prior art, with additional power transmission elements to the drive motor and thus additional causes of loss, the saw groups of the invention are considerably more efficient. The efficiency is expected to be around four percent better.

With a dual-spindle circular saw according to the invention, the wood can be cut on each spindle on both sides of its log plane with saw blades firmly clamped on a saw bush between saw blade gauges.

In order to simplify a change of the saw tool, in particular of the saw groups, as it is necessary in operation at each product (dimension) change and at a change of cutting edges, the saw tool preferably comprises at least one saw blade, in particular a circular saw blade group, which is exchangeably received on a tool clamp, i.e. a kind of bushing.

The tool clamp can be attached to the saw spindle by means of a feather key connection, for which purpose the tool clamp has, for example, a coaxial cylindrical bore and is thus seated on a corresponding axle stub associated with the saw spindle. The torsional strength is ensured by a feather key.

However, it is particularly advantageous if the tool clamp is detachably fastened by means of a quick-change cone to the saw spindle, which has a corresponding counterpart in the form of a conical axle stub, and is preferably secured in the mounting position by a screw connection coaxial with the saw spindle axis. The use of the saw bush with the quick-change cone and the screw lock is possible as a result of the floating bearing of the saw tool and permits a particularly rapid saw tool change. In addition, the tubular tool clamp offers the possibility of greatly improving the operating conditions of the circular saw blades.

If a head for actuating the screw connection is mounted in the tool clamp so that it can rotate freely but is axially secured, then the tool clamp can not only be advantageously secured on the saw spindle, but can also be pulled off the saw spindle at the same time, since the screw connection also acts as a pull-off tool.

The illustrated quick-change cone is not limited to use with the present invention. It can also be used independently on known twin spindle circular saws.

According to a further development of the invention, in order to be able to transmit particularly high power, the electric motor is liquid-cooled to avoid thermal problems. In addition, the armature, the stator, the fixed bearing and the floating bearing can be liquid-cooled, for which purpose four cooling circuits are preferably provided which can be temperature-controlled independently of one another by means of temperature control valves. In this way, the thermal effects of the electric motor on the bearings arranged in the same housing as well as the bearing power loss can be absorbed with intelligent liquid cooling. Also, the liquid cooling can be equipped with a temperature control and, optionally, with a heater to avoid dew point undershoot in the housing. It is advantageous to keep the temperature of the cooling medium as close as possible to a desired range by means of heating during standstill and by means of cooling during operation in order to avoid dimensional changes of the saw spindle due to temperature changes. The required flow rate for each of the four cooling circuits can be controlled individually and independently of each other by thermostatic valves, thus ensuring a maximum of temperature constancy at the optimal (quite different) level for each of the four cooling circuits and thus ensuring running accuracy and availability.

In the event of high power, a considerable amount of heat can be introduced into the housing via the electric motor located in the housing, and this heat must be dissipated accordingly. For the direct cooling of the armature, the saw spindle and the inner rings of the bearings, it is advisable if the saw spindle is liquid-cooled via a rotary union assigned to the end of the saw spindle facing away from the saw tool, for which purpose a sleeve connected to the rotary union is inserted into a bore coaxial with the saw spindle axis and extending in the axial direction preferably over the floating bearing, armature and fixed bearing in such a way that a flow channel is formed between the bore wall and sleeve. A coolant is introduced into the bore and flows through the bushing to its end region at the other saw spindle end, where it passes into the flow channel between the bushing and the bore wall, from where the coolant flows in the opposite direction and is discharged from the housing.

For cooling the stator, the stator can be inserted into the housing in such a way that a flow channel for liquid cooling of the stator is formed between the stator and the housing and/or in the housing enclosing the stator. When controlling the temperature of the stator, care must be taken to maintain a uniform operating and standstill temperature so that the insulation of the stator winding in the operating mode is not damaged by the constant current fluctuations (inherent in operation) and the resulting thermal expansion and contraction caused by temperature fluctuations, thus preventing short circuits or earth faults.

For cooling the bearings, they can be inserted in the housing in such a way that floating bearings and/or fixed bearings are inserted on the outer circumference into a bushing arranged in the housing in a bearing block so as to be fixed against rotation, wherein a flow channel is formed between the bushing and bearing block for liquid cooling of the bearings. The cooling of the outer bearing rings further stabilizes the system and makes it fatigue-resistant, as required for practically clearance-free fixed bearings and industrial use.

In all cases, it is advantageous if the flow channel extends helically around the saw spindle axis. This ensures circumferentially uniform cooling and thus uniform temperature distribution.

Since the permissible limiting speed generally decreases with larger bearings, it is advantageous if the floating bearing and fixed bearing each comprise at least one rolling bearing connected via fluid lines to a preferably central oil-air lubrication device. This permits the required high speeds with low losses and long maintenance intervals. The oil-air lubrication, with which oil is injected in minimal quantities in streak form directly onto the rolling elements, enables the high speeds required for the bearing size and causes an overpressure in the bearing housing interior, thus preventing the ingress of dirt. In addition, fine abrasion from bearing operation is washed away with the used oil flowing through the drainage holes, which is not possible with grease lubrication, for example.

The coils of the stator are preferably made of shaped wire, i.e. wire with, for example, a three-, four- or polygonal cross-section. This avoids punctual contact points over the cross-sectional circumference, so that there is no risk of damage to the insulation even after frequent changes in the length of the wire due to temperature changes. For the same reason, it is proposed that the pole ends of the coils of the stator be guided out of the housing on the end face and/or floating bearing side in the axial direction, in particular parallel to the saw spindle axis.

BRIEF DESCRIPTION OF THE INVENTION

In the drawing, the subject matter of the invention is shown by way of example, wherein.

DESCRIPTION OF THE PREFERRED EMBODIMENTS

Figure 1:
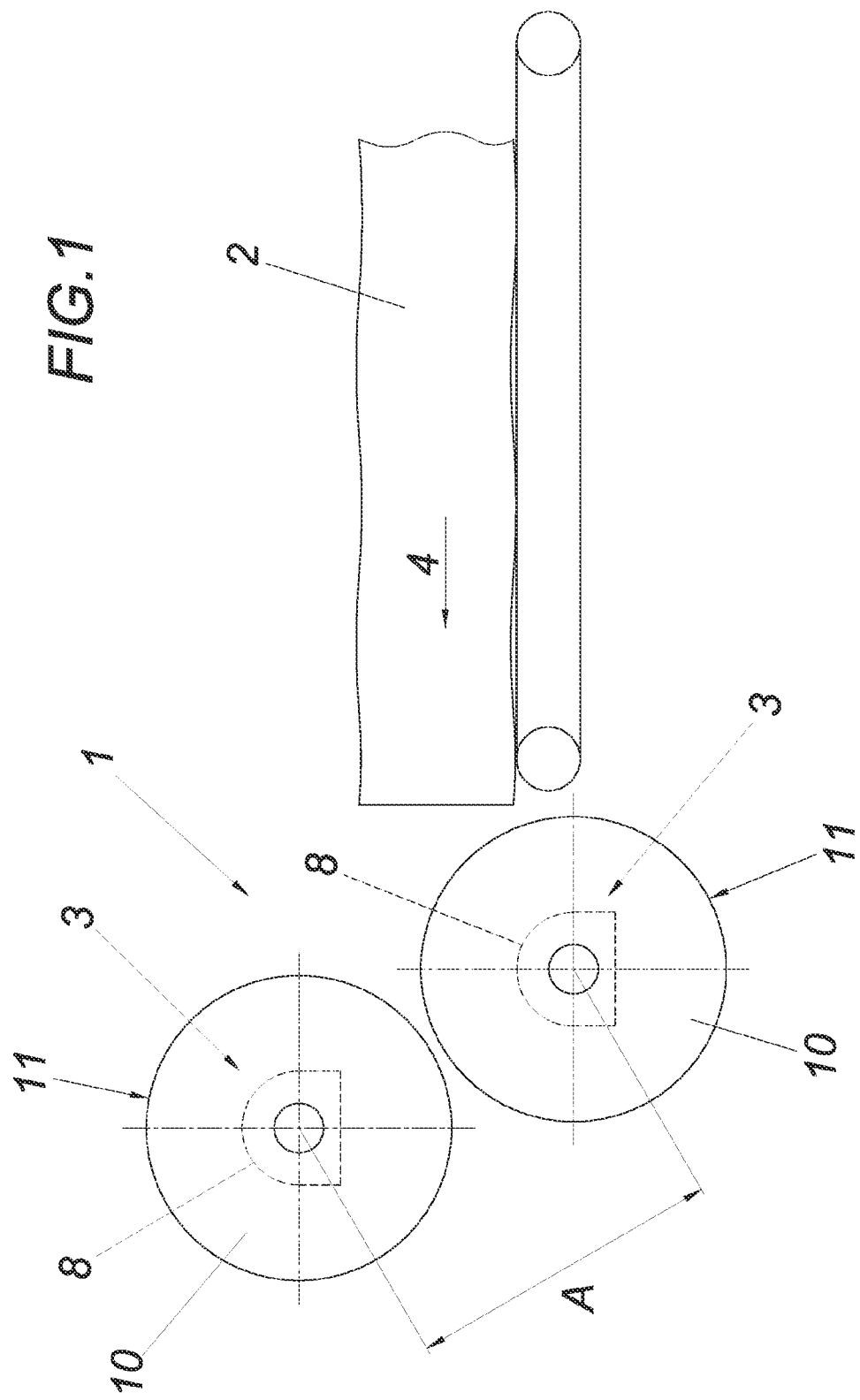
FIG. 1 shows a front view of a dual-spindle circular saw.
Figure 2:
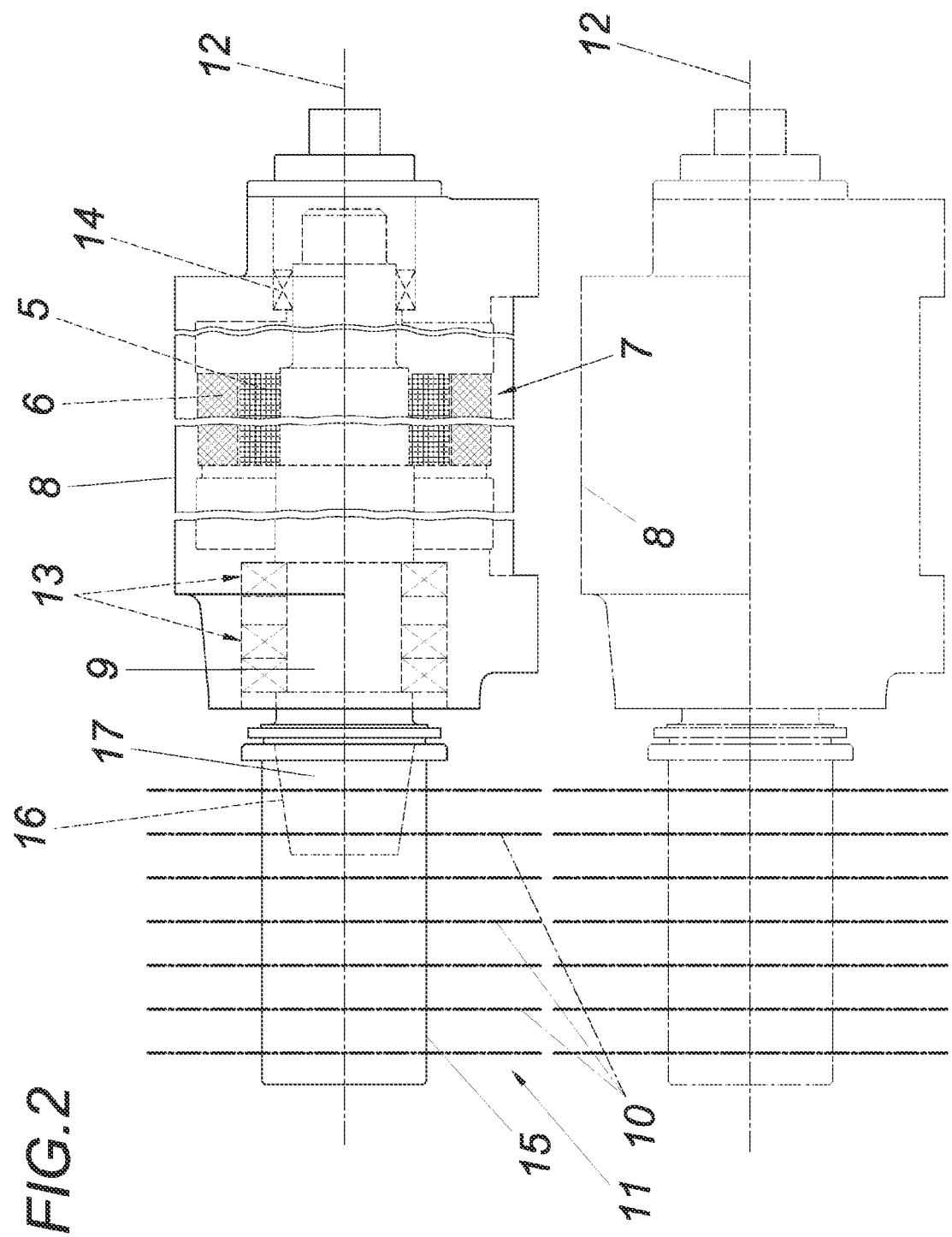
FIG. 2 shows a saw group of the dual-spindle circular saw in schematic longitudinal section.
Figure 3:
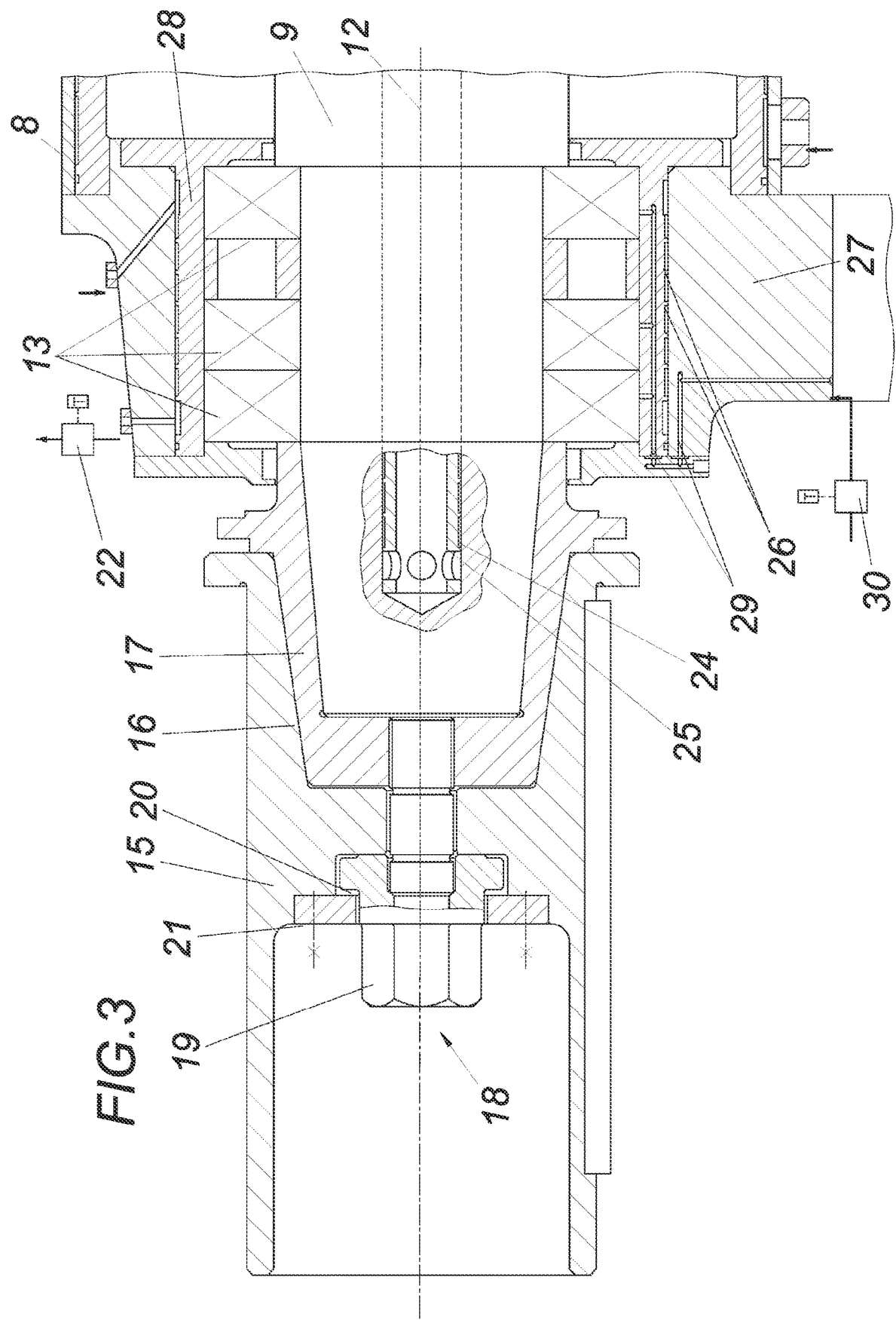
FIG. 3 shows the enlarged and more detailed left section with the fixed bearing of the saw group from FIG. 2.
Figure 4:
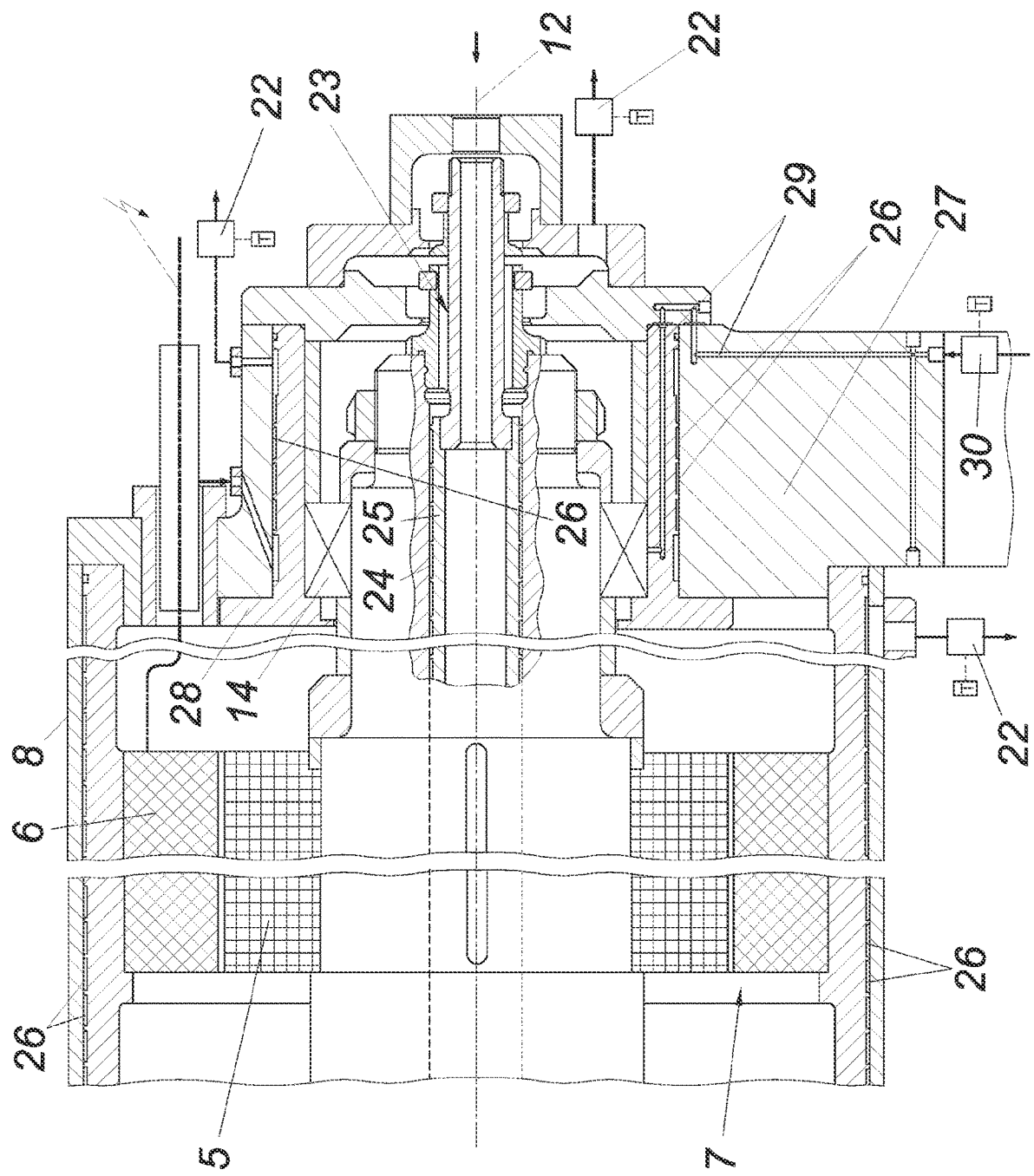
FIG. 4 shows the enlarged and more detailed right section with the floating bearing of the saw group from FIG. 2.

The dual-spindle circular saw 1 for sawing wood 2 comprises two saw groups 3. The saw groups 3 are offset in the cutting direction 4 of the wood 2 to be cut. Each saw group 3 has an electric motor 7, comprising an armature 5 and a stator 6, for a rotary drive of a saw spindle 9 mounted in a housing 8. The saw spindle 9 is connected in a rotationally fixed manner to at least one saw tool 11 comprising at least one replaceable circular saw blade 10. The saw tool 11 and the saw spindle 9 therefore rotate together at the same angular speed when driven. The center distance A of the saw spindles 9 can be adjusted with an actuator not shown in more detail. The lateral offset of the saw tools 11 relative to each other in the direction of the saw spindle axis 12 can also be adjusted with this or another actuator to ensure that the circular saw blades 10 of the two saw tools are precisely aligned with each other and lie in one and the same cutting plane.

According to the invention, the armature 5 is arranged in a rotationally fixed manner on the saw spindle 9 and the stator 6 is arranged in a rotationally fixed manner in the housing 8 between a fixed bearing 13 and a floating bearing 14 of the saw spindle 9. The saw tool 11 is mounted in cantilever fashion on the saw spindle 9. The saw groups 3 are arranged parallel to the saw spindle axis and with the housing 8 aligned in the same way in a machine frame or the like that is not shown in more detail.

The saw tool 11 comprises at least one saw blade 10 interchangeably accommodated on a tool clamp 15, optionally two or more saw blades 10, in particular a circular saw blade group. The tool clamp 15 is detachably fastened by means of a quick-change cone 16 in the manner of a steep cone (for example 7/24) to the saw spindle 9, which has a corresponding counterpart in the form of a conical axle stub 17, and is secured in the mounting position by a screw connection 18 coaxial with the saw spindle axis 12. In the exemplary embodiment, the axle stub 17 is a transition piece fitted to the saw spindle end, but it can also be formed directly by the saw spindle. A head 19, a screw or nut head, for actuating the screw connection with a corresponding tool, is freely rotatable but axially secured in the tool clamp 15. For this purpose, the head 19 is equipped with a shoulder 20, which at one end rests against the tool clamp 15 when the screw connection is tightened and is supported against an annular washer 21 when the screw connection is loosened and the tool clamp 15 is pulled off the axle stub 17.

The drive, in particular electric motor 7, is liquid-cooled. The armature 5, the stator 6, the fixed bearing 13, a group of rolling bearings, and the floating bearing 14 are liquid-cooled. Four cooling circuits, which can be temperature-controlled independently of one another by means of temperature control valves 22, are provided for this purpose. To avoid undershooting of the dew point in the housing, the cooling circuits can be equipped with a temperature control system to which a heater may be assigned in order to be able to control the temperature of the drive even when it is at a standstill.

For cooling the armature 5 and the inner rings of the fixed bearing 13 and floating bearing 14 via the saw spindle 9, the saw spindle 9 is liquid-cooled via a rotary union 23 associated with the end of the saw spindle 9 facing away from the saw tool. For this purpose, a sleeve 25 connected to the rotary union 23 is inserted into a bore 24 coaxial with the saw spindle axis 12 and extending in the axial direction, preferably via floating bearing, armature and fixed bearing, in such a way that a flow channel 26 is formed between the bore wall and sleeve 25. The stator 6 is inserted into the housing 8 in such a way that a flow channel 26 for liquid cooling of the stator 6 is formed between the stator 6 and the housing 8 or in the housing 8 enclosing the stator 6. In the present exemplary embodiment, the flow channel 26 is provided in the housing 8 between a stator receptacle and a housing shell or jacket tube, which is part of the housing and extends around the outer circumference of the housing. Floating bearings and/or fixed bearings are inserted for cooling on the outer circumferential side into a bushing 28 arranged non-rotatably in the housing in a bearing block 27, the flow channel 26 for liquid cooling of the bearings being formed between the bushing 28 and the bearing block 27. The flow channels of the bearing cooling, the armature cooling and the shaft cooling run helically around the saw spindle axis 12.

For cooling and lubrication of floating bearing 14 and fixed bearing 13, these are each connected to a central oil-air lubrication device 30 via at least one fluid line 29.

The invention claimed is:

1. A dual-spindle circular saw for sawing wood, said saw comprising:

two saw groups, wherein each saw group has a drive having an armature and a stator providing rotary driving of a saw spindle that is mounted in a housing and that is connected in a rotationally fixed manner to a saw tool, and wherein an actuator provides adjustment of a center distance of the saw spindles, wherein the armature is rotationally fixed on the saw spindle and the stator is rotationally fixed in the housing between a fixed bearing and a floating bearing of the saw spindle, and wherein the saw tool is cantileveredly mounted on the saw spindle;

wherein the saw tool comprises exchangeable circular saw blades in a circular saw blade group interchangeably supported on a tool clamp;

wherein the tool clamp is detachably fastened via a quick-change cone to the saw spindle, which has a corresponding counterpart in the form of a conical axle stub; and wherein the tool clamp is secured with a screw connection that extends coaxially with an axis of the saw spindle, and wherein the screw connection includes a head actuating the screw connection, and the head of the screw connection is mounted in the tool clamp so as to be freely rotatable but axially secured therein such that said head is configured so that a portion of the head engages a portion of the tool clamp and the head is a pull-off tool pulling the tool clamp off the axle stub when the screw connection is loosened.

2. A dual-spindle circular saw according to claim 1, wherein the armature or the stator of the drive, or both, are liquid-cooled.

3. A dual-spindle circular saw according to claim 2, wherein the liquid cooling is provided by a liquid cooling system that is equipped with a temperature control preventing undershooting of a dew point in the housing.

4. A dual-spindle circular saw according to claim 1, wherein the armature, the stator, the fixed bearing, and the floating bearing are liquid-cooled.

5. A dual-spindle circular saw according to claim 1, wherein the saw spindle is liquid-cooled by a rotary union operatively associated with an end of the saw spindle facing away from the saw tool, a sleeve being connected to the rotary union is inserted into a bore coaxial with an axis of the saw spindle, such that a flow channel is formed between the bore wall and sleeve.

6. A dual-spindle circular saw according to claim 5, wherein the flow channel extends helically around an axis of the saw spindle.

7. A dual-spindle circular saw according to claim 5, wherein the sleeve is inserted into the bore in an axial direction through the floating bearing, the armature, and the fixed bearing.

8. A dual-spindle circular saw according to claim 1, wherein the stator is inserted into the housing so as to form a flow channel providing liquid cooling of the stator between the stator and the housing, or the housing enclosing the stator has a flow channel providing liquid cooling of the stator.

9. A dual-spindle circular saw according to claim 8, wherein the housing includes a jacket tube extending around an outer circumference of the housing, and wherein the flow channel providing liquid cooling of the stator is formed between the jacket tube and the stator.

10. A dual-spindle circular saw according to claim 8, wherein the housing is provided with a jacket tube around an outer circumference thereof, and wherein the flow channel providing liquid cooling of the stator is formed between the jacket tube and the housing.

11. A dual-spindle circular saw according to claim 8, wherein the flow channel extends helically around an axis of the saw spindle.

12. A dual-spindle circular saw according to claim 1, wherein the floating bearings or the fixed bearings are inserted into a bushing supported rotationally fixed in the housing in a bearing block, wherein a flow channel providing liquid cooling of the bearings is formed between the bushing and the bearing block.

13. A dual-spindle circular saw according to claim 1, wherein the floating bearing and the fixed bearing each comprise at least one rolling bearing connected via fluid lines to an oil-air lubrication device.

14. A dual-spindle circular saw according to claim 1, wherein the stator has coils that are formed of shaped wire.

15. A dual-spindle circular saw according to claim 1, wherein the stator has coils with pole ends, and the pole ends of the coils of the stator are guided out of the housing on an end face side or a floating bearing side in an axial direction parallel to an axis of the saw spindle.

16. A dual-spindle circular saw according to claim 1, wherein a screw connection coaxial with an axis of the saw spindle secures the tool clamp in a mounting position.

17. A dual-spindle circular saw according to claim 1, wherein the floating bearing and the fixed bearing each comprise at least one rolling bearing connected via fluid lines to a central oil-air lubrication device.

* * * * *